United States Patent [19]

Wang

[11] Patent Number: 4,968,770

[45] Date of Patent: Nov. 6, 1990

[54] POLYAMIDE FROM SPIRODILACTAM PRECURSOR AND PRIMARY DIAMINE

[75] Inventor: Pen C. Wang, Houston, Tex.

[73] Assignee: Shell Oil Company, Houston, Tex.

[21] Appl. No.: 245,432

[22] Filed: Sep. 16, 1988

[51] Int. Cl.$^5$ .............................................. C08G 69/26
[52] U.S. Cl. .................................... 528/229; 528/323; 528/335
[58] Field of Search ......................... 528/229, 335, 323

[56] References Cited

U.S. PATENT DOCUMENTS

| | | | |
|---|---|---|---|
| 2,149,678 | 3/1939 | Hovey et al. | 260/2 |
| 2,195,570 | 4/1940 | Hovey et al. | 260/55 |
| 2,279,752 | 4/1942 | Jacobson | 528/229 |
| 2,987,502 | 6/1961 | Ferstandig | 260/29.2 R |
| 3,408,334 | 10/1968 | Caldwell et al. | 260/78 |
| 3,637,602 | 1/1972 | Conciatori | 260/78 |
| 3,778,411 | 12/1973 | Emerick et al. | 260/65 |
| 4,064,086 | 12/1977 | Cowsar et al. | 260/29.2 |
| 4,595,745 | 6/1986 | Nakama et al. | 528/125 |

FOREIGN PATENT DOCUMENTS 43-22651  9/1968  Japan .

OTHER PUBLICATIONS

Hachihama et al., *J. Soc. Chem. Ind.*, Japan, 45, p. 404B, (1942).
Hachihama et al., *J. Soc. Chem. Ind.*, Japan, 46, p. 119B, (1943).
Kobayashi et al., *Sen-i Gackaishi*, 14, pp. 880-882, (1958).
Obseo et al., *Revista de Plastecos Modernos*, XXVIII, No. 257, (1977), pp. 679-686 and translation.

*Primary Examiner*—Harold D. Anderson

[57] ABSTRACT

Novel polyamide polymers incorporating moieties of a [4.4] spirodilactam with spiro ring nitrogens in the 1- and 6- spiro ring positions and moieties of a primary diamine are produced by reaction of the primary diamine and a spirodilactam precursor selected from 4-oxoheptanedioic acid compounds or [4.4] spirodilactones having spiro ring oxygen atoms in the 1- and 6-spiro ring positions.

12 Claims, No Drawings

POLYAMIDE FROM SPIRODILACTAM PRECURSOR AND PRIMARY DIAMINE

FIELD OF THE INVENTION

This invention relates to certain novel polyamide polymers and to a process for the production thereof. More particularly, the invention relates to novel polyamide polymers containing moieties of a [4.4] spirodilactam and moieties derived from a primary diamine.

BACKGROUND OF THE INVENTION

The class of polyamide polymers is broadly well known in the art. A commercial example of this class of polymers is the polyamide illustratively produced from hexamethylenediamine and adipic acid known as Nylon 66. The nature of the reaction product of a carboxylic acid or related compound will vary, however, depending upon the chemical nature of the acid compound and the amine.

The reaction of a ketobenzoic acid, i.e., benzoylbenzoic acid, and diamines is shown by Hovey et al, U.S. Pat. Nos. 2,149,678 and 2,195,570. The reaction of aromatic dicarboxylic acids and photosensitive diamine compounds is shown by Nakama et al, U.S. Pat. No. 4,595,745. Caldwell et al, U.S. Pat. No. 3,408,334, describe the reaction of dicarboxylic acids and diamines in the presence of a tin compound as catalyst. Reaction of $\alpha,\beta$-unsaturated aromatic dicarboxylic acids and primary and secondary diamines is disclosed by Conciatori, U.S. Pat. No. 3,637,602. The production of polyamideimides by reactions including that of a diacid and polyamides is shown by Emerick et al, U.S. Pat. No. 3,778,411. The use of a dicarboxylic acid of additional functionality, 4-oxoheptanedioic acids, in the production of polymers is shown by Ferstandig, U.S. Pat. No. 2,987,502, but reaction was with a polyhydroxylic alcohol and the product was a polyester.

A class of compounds that functions in some ways similar to dicarboxylic acids is the class of 1,6-dioxa[4.4] spirodilactones. The simplest member of this class, 1,6-dioxaspiro[4.4]nonane-2,7-dione, is known and has been prepared, among other procedures, by the process of Pariza et al, Synthetic Communications, Vol. 13(3), pp. 243-254 (1983). These spirodilactones have demonstrated utility as curing agents to produce cured compositions which do not shrink upon curing. This property probably results from opening of the spirodilactone rings during the curing process, Knowles, J. Appl. Polymer Science, Vol. 10(6), pp. 887-889 (1966). It is characteristic of the spirodilactone ring system that reaction with active hydrogen compounds tends to produce ring-opened products, as further evidenced by the above Pariza et al article. See also Cowsar et al, U.S. Pat. No. 4,064,086. One reaction of 1,6-dioxaspiro[4.4]nonane-2,7-dione in which a ring system is maintained is described and claimed in copending U.S. patent application Ser. Nos. 172,052, filed Mar. 23, 1988 and 245,618 filed Sept. 16, 1988 wherein the spirodilactones are reacted with hydroxy-containing primary amino compounds to produce monomeric substituted spirodilactams.

The polyamide polymers of the present invention are thermoplastic polymers as are many other polymeric polyamides. However, because of the relatively low melting point or glass transition temperatures exhibited by many polymeric polyamides, the thermoplastic polyamides are not generally useful as engineering thermoplastics where exposure to elevated temperatures is likely to be encountered. It would be of advantage to provide novel polymeric polyamides having relatively high glass transition temperatures. It would be of further advantage to provide processes employing dicarboxylic acid compounds or alternatively spirodilactones to produce such polymeric polyamides.

SUMMARY OF THE INVENTION

The present invention provides a class of novel polyamide polymers and a process for the production thereof. More particularly, the present invention relates to the production of novel polymeric polyamides by reaction of a primary diamine with a spirodilactam precursor to produce linear, alternating polyamide polymers in incorporating moieties of a 1,6-diaza[4.4] spirodilactam and moieties derived from the primary amine.

DESCRIPTION OF THE INVENTION

The polymeric polyamides of the invention are produced by reaction of a primary diamine, i.e., an organic compound having two primary amino groups ($-NH_2$ groups) with a spirodilactam precursor. In one modification of the invention, the spirodilactam precursor is a ketodicarboxylic acid compound having two carbon atoms between the keto group and each carboxy function. In other terms, the ketodicarboxylic acid compound is a 4-oxoheptanedioic acid compound. Although a variety of such ketodiacid compounds having a variety of substituents in addition to the oxo moiety and the carboxy functions, the preferred 4-oxoheptanedioic acid compounds have up to 30 carbon atoms and are represented by the formula

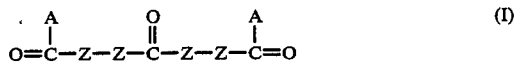

wherein A independently is hydroxy, alkoxy, preferably lower alkoxy of up to 4 carbon atoms, or halo, preferably the middle halogens chloro or bromo, and Z independently is $>C(Z')_2$ in which Z' independently is hydrogen, lower alkyl, preferably methyl or halo, preferably the lower halogens fluoro or chloro, or Z is such that two adjacent Z moieties taken together form a ring system Z" of from 5 to 7 ring atoms inclusive, up to two of which are heteroatoms selected from nitrogen, oxygen or sulfur with the remainder of the ring atoms being carbon atoms, there being up to 15 carbon atoms inclusive in each Z", two of which form a bridge between the central carbon atom of the molecule, in this case the carbon atom of oxo moiety, and the indicated carbon atom of a carboxy function (a

group). When the Z moieties taken together form a ring system, the ring(s) is(are) aromatic, cycloaliphatic or heterocyclic and hydrocarbyl containing only atoms of carbon and hydrogen besides any heteroatoms or is (are) substituted hydrocarbyl containing additional atoms such as halogen, preferably middle halogen, in the form of inert carbon atom substituents.

In one embodiment employing the ketodiacid compound spirodilactam precursor, each Z moiety is >C(Z)₂ and the ketodiacid compound is an acyclic 4-oxoheptanedioic acid compound. In one such embodiment, largely because of a particularly convenient method of producing the spirodilactam precursor, the 4-oxoheptanedioic acid compound has at least one hydrogen on the carbon atom adjacent to each carboxy function, that is, at least one Z' on each carbon atom adjacent to a carboxy function will be hydrogen. Such 4-oxoheptanedioic acid compounds are represented by the formula

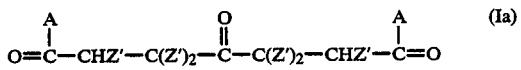

wherein A and Z' have the previously stated meaning. Such 4-oxoheptanedioic acid compounds include 4-oxoheptanedioic acid, dimethyl 4-oxoheptanedioate, 2,6-dimethyl-4-oxoheptanedioic acid, 2,3,5,6-tetramethyl-4-oxoheptanedioyl chloride, di-n-propyl 2,6-di-n-butyl-4-oxoheptanedioic acid and 7-carbomethoxy-3,3,5,5-tetramethyl-4-oxohexanoic acid. The preferred ketodiacid compounds of the above formula Ia are those wherein each Z' is hydrogen or methyl, especially hydrogen, and each A is hydroxy or methoxy, especially hydroxy.

Many of these ketodiacid compounds are known compounds or are Produced by known methods, but the esters of the above formula Ia, i.e., the compounds wherein A is alkoxy, are produced by the reaction of formaldehyde with an α,β-ethylenically unsaturated carboxylic acid ester such as methyl acrylate, ethyl methacrylate, methyl crotonate, methyl ethacrylate and propyl 2,2-dimethylbutanoate. This reaction is conducted in the presence of a catalyst system which comprises a thiazolium salt and a tertiary amine and produces the dialkyl 4-oxoheptanedioate derivative in good yield. This process is described in greater detail in copending U.S. patent application Ser. No. 171,999, filed Mar. 23, 1988, now U.S. Pat. No. 4,800,231 incorporated herein by reference. Conversion of the esters thereby obtained to free acids or acid halides is by conventional methods as is the interconversion of the acids, esters or acid halides of formula Ia in general.

In a second embodiment of the ketodiacid compound spirodilactam precursor, the 4-ketodiacid incorporates cyclic moieties between the keto group and the carboxy function, i.e., two adjacent Z moieties from a cyclic ring structure Z''. Such diacid compounds are represented by the formula

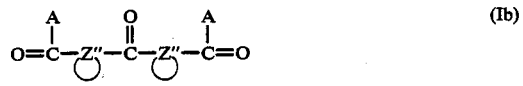

wherein Z'' has the previously stated meaning. Illustrative of these cyclic ketodiacids are di(2-carboxycyclohexyl) ketone, di(2-carboxyphenyl) ketone, di(2-carbopropoxycyclo-4-pentenyl) ketone, di(3-chlorocarbonylphenyl) ketone, di(2-carboxypyridyl) ketone, 2-carboxyphenyl N-methyl-3-carboxy-2-pyrryl ketone, di(3-carbethoxy-2-morpholyl) ketone and di(3-carbomethoxy-2-naphthyl) ketone. The preferred cyclic ketodiacid compounds of formula Ib are those wherein each Z'' is a ring system of from 5 to 6 atoms inclusive and up to one nitrogen heteroatom.

Such dicyclic 4-ketodiacid compounds are known compounds or are produced by known methods, for example, the method of U.S. Pat. No. 1,999,308 or the method of Cava et al, J. Amer. Chem. Soc., 77, 6022(1955).

In yet another modification of the ketodiacid compound spirodilactam precursor, the ketodiacid incorporates one cyclic moiety with the remainder of the Z moieties being acyclic, i.e., the compounds represented by the formula

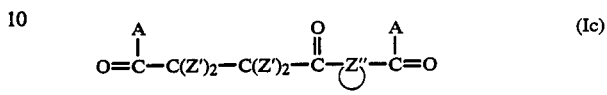

wherein A, Z' and Z'' have the previously stated meanings. Such ketodiacids of one cyclic moiety are illustrated by 3-(2-carboxybenzoyl)propionic acid, 3-(2-carbomethoxy-2-pyridyloyl)-2-ethylpropionic acid, ethyl 3-(2-carbethoxybenzoyl)propionate and 3-(2-carboxy-4-methylbenzoyl)butyrl chloride. The ketodiacids of the above formula Ic are known compounds or are produced by known methods. For example, 2-carboxymethylbenzaldehyde reacts with methyl acrylate according to the general teachings of copending U.S. patent application Ser. No. 171,999, filed Mar. 23, 1988, to produce methyl 3-(2-carbomethoxybenzoyl)propionate.

In a second modification of the invention, the spirodilactam precursor is a 1,6-dioxaspiro[4.4]nonane-2,7-dione compounds wherein the spiro ring system is substituted with hydrogen, alkyl or halogen, or which incorporates fused cyclic substituents which include the 3- and 4-spiro ring positions and/or the 8- and 9-spiro ring positions of the spiro ring system. One class of such [4.4] spirodilactones is represented by the formula

wherein Z has the previously stated significance, it being understood that the two carbon atoms of any Z'' which form a bridge between the oxo carbon atom as the central carbon atom and the carbon atom of a carboxy function in the spirodilactam precursor of formula I, in the spirodilactam precursors of formula II form a bridge between the equivalent carbon atoms which are the carbon atoms of a carbonyloxy group and the central spiro carbon atom, i.e., the carbon atom common to the two rings.

In the embodiment of these spirodilactone spirodilactam precursors of the above formula II wherein each Z' is >C(Z)₂, the spirodilactone is represented by the formula

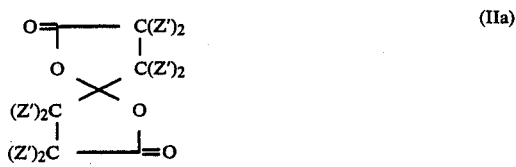

wherein Z' has the previously stated meaning. Illustrative of such spirodilactones are 1,6-dioxaspiro[4.4]nonane-2,7-dione, 3,8-dimethyl-1,6-dioxaspiro[4.4]nonane-2,7-dione, 3,4,8,9-tetramethyl-1,6-dioxaspiro[4.4]- nonane-2,7-dione, 4,9-diethyl-1,6-diazaspiro[4.4]nonane-2,7-dione, 3,3,8,8-tetramethyl-1,6-dioxaspiro[4.4-]nonane-2,7-dione, 3,3,4,4,8,8,9,9-octamethyl-1,6-dioxaspiro[4.4]nonane-2,7-dione and 3,4,8,9-tetrafluoro-1,6-dioxaspiro[4.4]nonane-2,7-dione. The preferred spirodilactones of the above formula IIa are those wherein at least one Z' of each Z'-substituted carbon atom is hydrogen.

The compounds of formula IIa are known compounds or are produced by known methods such as the process of the above Pariza et al article, herein incorporated by reference.

In the embodiment of the spirodilactone spirodilactam precursors of the above formula II which incorporate a cyclic moiety as a part of the two rings of the spiro ring system, the spirodilactones are represented by the formula

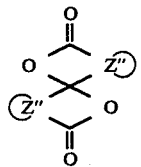
(IIb)

wherein Z' has the previously stated meaning. Typical compounds of this formula IIb are 3,4,8,9-dibenzo-1,6-dioxaspiro[4.4]nonane-2,7-dione, 3,4,8,9-di(cyclopentano)-1,6-dioxaspiro[4.4]nonane-2,7-dione, 3,4,8,9-di(4-methylbenzo)-1,6-dioxaspiro4.4]nonane-2,7-dione and 3,4,8,9-di(pyrido)-1,6-dioxaspiro[4.4]nonane-2,7-dione. These compounds are known compounds or are produced by known methods, for example, the process of the above Cava et al article or by the process of U.S. Pat. No. 1,999,308.

In a third embodiment of the spirodilactone spirodilactam precursor, a cyclic moiety is fused to one spiro ring and the other spiro ring is free from fused ring substituents. Such spirodilactones are represented by the formula

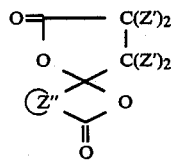
(IIc)

wherein Z' and Z" have the previously stated meanings. Such spirodilactones are illustrated by 3-methyl-8,9-benzo-1,6-dioxaspiro[4.4]nonane-2,7-dione, 3,4-benzo-1,6-dioxaspiro[4.4]nonane-2,7-dione, and 3,3,4,4-tetramethyl-8,9-morphols-1,6-diazaspiro[4.4]nonane-2,7-dione. The spirodilactones of the above formula IIc are produced by known methods, for example, the dehydration of the corresponding ketodiacid. By way of illustration, 3,4-benzo-1,6-dioxaspiro[4.4]nonane-2,7-dione is produced by dehydration of 3-(2-carboxybenzoyl)propionic acid through application of heat.

In general, the preferred spirodilactone spirodilactam precursors are hydrocarbon except for the oxygen atoms of the lactone moieties, and Particularly preferred are those spirodilactones which are free from fused ring substituents (formula IIa) or those which have a fused ring substituent on each of the spiro rings (formula IIb). An especially preferred spirodilactone spirodilactam precursor of the first class is 1,6-dioxaspiro[4.4]nonane-2,7-dione while a preferred spirodilactone of the latter class is 3,4,8,9-dibenzo-1,6-dioxaspiro[4.4]nonane-2,7-dione.

The spirodilactam precursor is reacted according to the process of the invention with a primary diamine, that is, an organic compound having two primary amino groups, i.e., -NH$_2$ groups, as carbon atom substituents. While the reaction to produce polymeric polyamides will take place with a variety of primary diamines having a variety of structures, best results are obtained in the process o: the invention if the two amino groups are not located on adjacent carbon atoms, that is, at least one carbon atom separates the two carbon atoms on which the two amino groups are substituents. One such class of primary diamines comprises diamines of up to 30 carbon atoms inclusive which are represented by the formula $$H_2N—R—NH_2 \qquad (III)$$

where R is a divalent organic radical of up to 30 carbon atoms inclusive and is divalent alkylene or is divalent arylene of from 1 to 2 aromatic rings inclusive, which, when two aromatic rings are present, incorporates rings which are fused or which are connected by a direct valence bond, alkylene of up to 8 carbon atoms inclusive, oxy, thio, sulfonyl, carbonyl, dioxyphenylene, i.e.,

2,2-di(oxyphenyl)propane, i.e.,

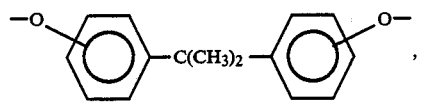

di(oxyphenyl) sulfone, i.e.,

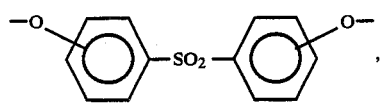

or dioxydiphenylene, i.e.,

with the proviso that the two amino substituents are not located on adjacent carbon atoms. R is preferably hydrocarbyl, that is, contains only atoms of carbon and hydrogen besides the other atoms of divalent linking groups, or is substituted hydrocarbyl additionally containing other atoms as inert, monovalent substituents of carbon atoms, for example, halogen atoms, preferably middle halogens.

Illustrative of alkylene-containing diamines of the above formula III are trimethylenediamine, tetramethylenediamine, hexamethylenediamine, octamethylenediamine, 1,7-diamino-4-methyloctane, 1,4-diaminocyclohexane, di(4-aminocyclohexyl)methane, dodecamethylenediamine and 1,6-diamino-3,4-diethylhexane. Arylene diamines of the above formula III include 1,4-phenylenediamine, 2,4-toluenediamine, 4,4'-diaminobiphenyl, 1,5-diaminonaphthalene, di(3-aminophenyl) ether, di(4-aminophenyl) methane, 2,2-di(3-amino-4-methylphenyl)propane, di(4-amino-4-ethylphenyl) sulfone, di(3-amino-4-chlorophenyl) ketone, di(2-aminophenyl) sulfide, 1,3-di(3-aminophenyloxy)benzene, 2,2-di(4-aminophenyloxyphenyl)propane and 4,4'-di(4-aminophenyloxy)biphenyl. The preferred primary diamines are those of the above formula III where R is divalent arylene and which are otherwise hydrocarbyl except for any additional atoms of divalent linking groups. Particularly preferred are the di(aminophenyl)alkanes, especially the di(4-aminophenyl)alkanes such as di(4-aminophenyl)methane.

In the reaction mixture the spirodilactam precursor and the Primary diamine are employed in molar ratios of from about 2:1 to about 1:2. Although mixtures of several primary amine reactants and several spirodilactam precursors are suitably employed to produce a polymeric polyamide of varying moieties, best results are obtained when a single diamine and a single spirodilactam precursor are used. To produce the linear, alternating polymeric polyamides of the invention, the primary amine and the spirodilactam precursor react in a 1:1 molar ratio and the use of reactant ratios that are substantially stoichiometric, i.e., substantially 1:1, are preferred. During reaction, reactant contact is maintained by conventional methods such as by shaking, stirring or refluxing and the reaction is conducted in a liquid phase in the presence of an inert reaction diluent. Diluents which are inert to the reactants and the polyamide product and which are capable of dissolving the reactants, at least at reaction temperature, are satisfactory. Suitable diluents include ketones such as methyl isobutyl ketone and di-isopropyl ketone, esters such as ethyl 2-ethylhexanoate, ethers including acyclic ethers such as diethylene glycol diethyl ether and tetraethylene glycol dimethyl ether as well as cyclic ethers such as dioxane and tetrahydrofuran, phenols such as phenol and the cresols, particularly m-cresol, N-alkylamides such as N,N-dimethylacetamide, N,N-dimethylformamide and N-methyl-2-pyrrolidone and sulfur-containing diluents such as dimethyl sulfoxide and sulfolane. It is particularly convenient to employ as a reaction diluent, either alone or in conjunction with other suitable diluents, an inert organic diluent which forms an azeotrope with water, e.g., benzene, toluene, xylene, ethylbenzene or halogenated benzenes such as chlorobenzene. This procedure facilitates the polymerization reaction and also allows the by-product water to be removed as a generally low-boiling azeotrope.

The reaction of the primary diamine and the spirodilactam precursor takes place in a suitable reactor under polymerization conditions. Suitable reaction temperatures are elevated temperatures from about 40° C. to about 300° C. but preferably from about 150° C. to about 250° C. Suitable reaction pressures are sufficient to maintain the reaction mixture in a liquid phase at reaction temperatures. Such pressures are pressures of up to about 20 atmospheres but more generally are pressures from about 0.8 atmospheres to about 5 atmospheres. Subsequent to reaction, the polymeric polyamide product is recovered from the product mixture by conventional methods such as selective extraction, fractional distillation or precipitation.

The polyamide polymers of the invention are linear, alternating reaction products wherein the primary diamine and the spirodilactam precursor have condensed to produce 4.4] spirodilactam moieties incorporating the amino nitrogen atoms of the primary diamine in the 1- and 6-ring positions of the spiro ring structure, which spirodilactam moieties are connected by the non-amino residue of the primary diamine, i.e., the R moiety without consideration of the amino substituents. In terms of the preferred reactants as described above, the polymeric polyamides are represented by the repeating formula

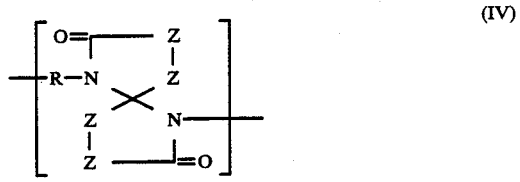

(IV)

wherein R and Z have the previously stated meanings. The nomenclature of such polyamide polymers is not easily understood because of the complexity of the polymer molecule but the identity of the polymer product will be apparent from the above formulas for the reactants (formulas I, II and III) and the polyamide product (formula IV). By way of illustration, however, the polyamide polymer produced from trimethylenediamine and either 1,6-dioxaspiro[4.4]nonane-2,7-dione or 4-oxoheptanedioic acid is represented by the repeating formula

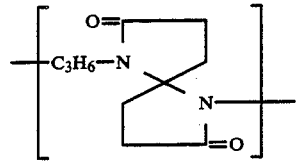

The preferred polyamide polymers of the above formula IV are those wherein Z is hydrogen or methyl when Z is acyclic, or where the adjacent Z moieties are benzo when the Z moieties are fused cyclic, and wherein R is divalent arylene, particularly divalent arylene comprising 2 aromatic rings connected by alkylene, e.g., di(phenylene)alkane.

The polymeric polyamides of the invention are thermoplastic polymers having an average molecular weight of from about 1000 to about 100,000 and find utility in the applications normally associated with thermoplastics. The polyamides are processed by the usual methods such as extrusion, injection molding and thermoforming into films, sheets and molded articles and the polymers are additionally useful in adhesive formulations. However, because of the relatively high glass transition temperatures exhibited by the polyamide polymers of the invention they are useful as engineering thermoplastics for applications where elevated temperatures are likely to be encountered including the production of containers for food and drink, base materials for electrical and electronic applications and shaped parts for automotive usage.

The invention is further illustrated by the following Illustrative Embodiments which should not be construed as limiting.

Illustrative Embodiment I

A mixture of 17.4 g (0.1 mole) of 4-oxoheptanedioic acid, 19.8 g (0.1 mole) of di(4-aminophenyl)methane and 50 ml of m-cresol was placed in a 100 ml resin pot equipped with a mechanical stirrer and a condenser. While being stirred, the mixture was warmed to 200° C. and the water formed was removed by azeotropic distillation with a portion of the m-cresol. The resulting mixture was refluxed for 12 hours, cooled, and then poured into 1 liter of methanol. The precipitated product was recovered by filtration and dried in a vacuum oven at 150° C. for 24 hours. The glass transition temperature of the product was 242° C. and the nuclear magnetic resonance spectra of the product were consistent with the repeating structure

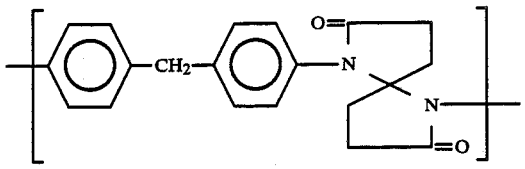

Illustrative Embodiment II

A mixture of 7.81 g (0.05 mole) of 1,6-dioxospiro[4.4]nonane-2,7-dione, 9.91 g (0.05 mole) of di(4-aminophenyl)methane and 50 ml of m-cresol was placed in a 100 ml resin pot equipped with a mechanical stirrer and a condenser. While being stirred, the mixture was warmed to 200° C. and the water produced was removed by azeotropic distillation with a portion of the m-cresol. The resulting mixture was refluxed for 12 hours, cooled, and then poured into 1 liter of methanol. The precipitated product was recovered by filtration and dried in a vacuum oven at 150° C. for 24 hours. The product had a glass transition temperature of 250° C. and the nuclear magnetic resonance spectra of the product were consistent with the repeating structure shown in Illustrative Embodiment I.

Illustrative Embodiment III

A mixture of 10.3 g (0.05 mole) of bis(4-aminocyclohexyl)methane, 7.81 g (0.05 mole) of 1,6-dioxaspiro[4.4]nonane-2,7-dione and 100 ml of N-methyl-2-pyrrolidone is placed in a 500 ml round-bottomed flask equipped with a mechanical stirrer and a condenser. The mixture, while being stirred, was warmed to 200° C. and the water produced was removed by azeotropic distillation with a portion of the N-methyl-2-pyrrolidone. The resulting mixture was refluxed for 24 hours, then cooled, and poured into 3 liters of water. The precipitated product was recovered by filtration and dried in a vacuum oven at 110° C. for 24 hours. The glass transition temperature of the product was 239° C. and the nuclear magnetic resonance spectra of the product were consistent with the repeating structure

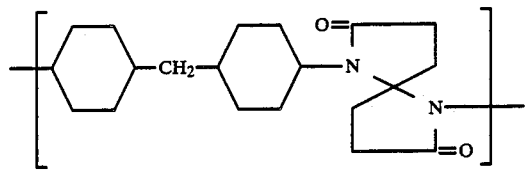

What is claimed is:

1. A polymeric polyamide of the repeating formula

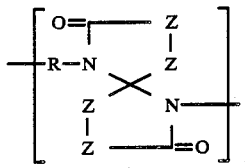

wherein Z independently is >C(Z')$_2$ in which Z' independently is hydrogen lower alkyl or halogen, or Z is such that two adjacent Z moieties taken together form a ring system Z" of from 5 to 7 ring atoms, up to two of which are heteroatoms selected from nitrogen, oxygen or sulfur with the remainder of the ring atoms being carbon atoms, there being up to 15 carbon atoms inclusive in each Z", two of which form a connecting group between the spiro carbon atom and a carbon atom of a carbonyl group, and R is divalent arylene of from 1 to 2 aromatic rings inclusive which, when two rings are present, are fused or are connected by a direct valence bond or are connected by alkylene of up to 8 carbon atoms inclusive, oxy, thio, sulfonyl, carbonyl, dioxyphenylene, 2,2-di(oxyphenyl)propane, di)oxyphenyl) sulfone or dioxydiphenylene.

2. The polyamide of claim 1 wherein each Z is >C(Z')$_2$.

3. The polyamide of claim 2 wherein Z' is hydrogen.

4. The polyamide of claim 2 wherein R is di(phenyl)alkane.

5. The polyamide of claim 2 wherein R is di(phenylene)methane.

6. The polyamide of claim 3 wherein R is di(4-phenyl)methane.

7. The polyamide of claim 1 wherein adjacent Z moieties are Z".

8. The polyamide of claim 7 wherein Z" is benzo.

9. The polyamide of claim 8 wherein R is di(phenyl)methane.

10. The polyamide of claim 9 wherein R is di(4-phenyl)methane.

11. The polyamide of claim 7 wherein Z" is pyrido.

12. The polyamide of claim 11 wherein R is di(4-phenyl)methane.

* * * * *